(12) United States Patent  
Bandera

(10) Patent No.: US 8,991,770 B2
(45) Date of Patent: *Mar. 31, 2015

(54) HELICOPTER CONTROL STICK SUPPORT ASSEMBLY

(71) Applicant: AGUSTA S.p.A., Samarate (IT)

(72) Inventor: Gian Luigi Bandera, Samarate (IT)

(73) Assignee: AGUSTA S.p.A., Samarate (IT)

( * ) Notice: Subject to any disclaimer, the term of this patent is extended or adjusted under 35 U.S.C. 154(b) by 0 days.

This patent is subject to a terminal disclaimer.

(21) Appl. No.: 14/035,679

(22) Filed: Sep. 24, 2013

(65) Prior Publication Data
US 2014/0061388 A1 Mar. 6, 2014

Related U.S. Application Data

(63) Continuation of application No. 12/980,838, filed on Dec. 29, 2010, now Pat. No. 8,556,216.

(30) Foreign Application Priority Data

Dec. 30, 2009 (EP) ..................................... 09425543

(51) Int. Cl.
*B64C 13/06* (2006.01)
*B64C 13/14* (2006.01)
*G05G 1/04* (2006.01)

(52) U.S. Cl.
CPC ..................................... *B64C 13/06* (2013.01)
USPC ............ 244/221; 244/224; 244/234; 280/775

(58) Field of Classification Search
USPC ................. 244/220, 221, 223, 224, 234, 237; 74/492, 493, 526, 527; 194/247; 280/775, 779
See application file for complete search history.

(56) References Cited

U.S. PATENT DOCUMENTS

| 3,580,636 A | 5/1971 | Setto |
| 3,628,396 A | 12/1971 | Grobowski |
| 3,799,569 A | 3/1974 | Baker |

(Continued)

FOREIGN PATENT DOCUMENTS

EP 0 374 737 A2 6/1990

OTHER PUBLICATIONS

European Search Report of Application No. 09425543 Dated May 12, 2010.

*Primary Examiner* — Christopher P Ellis
*Assistant Examiner* — Marc Burgess
(74) *Attorney, Agent, or Firm* — Venable LLP; Robert Kinberg; Tamatane J. Aga

(57) ABSTRACT

A support assembly for a helicopter control stick is provided. The support assembly includes a supporting structure and an instrument panel fixed to each other; and a connecting assembly for connecting the stick to the supporting structure. The connecting assembly includes an arm elongated in a longitudinal direction and having one end supporting the stick; a guide for connecting the arm in longitudinally sliding manner to the supporting structure, to move the end to and from the supporting structure; and a rotary assembly for connecting the arm to the supporting structure in rotary manner about a horizontal axis, to adjust the height of the end. The rotary assembly has a first releasable retainer, wherein the first releasable retainer operates to lock rotation of the arm with respect to the supporting structure in a desired angular position.

7 Claims, 4 Drawing Sheets

(56) References Cited

U.S. PATENT DOCUMENTS

| | | | |
|---|---|---|---|
| 4,012,014 A | 3/1977 | Marshall | |
| 4,527,444 A | 7/1985 | McKee et al. | |
| 4,603,855 A | 8/1986 | Sebelle | |
| 4,723,461 A * | 2/1988 | Yoshida et al. | 74/493 |
| 4,793,204 A | 12/1988 | Kubasiak | |
| 4,961,548 A | 10/1990 | Adams et al. | |
| 5,131,287 A | 7/1992 | Stromberg | |
| 5,988,010 A | 11/1999 | Olgren | |
| 6,357,317 B1 | 3/2002 | Livengood et al. | |
| 6,357,318 B1 | 3/2002 | Koellisch et al. | |
| 6,688,644 B2 | 2/2004 | Tsunoda et al. | |
| 6,758,494 B2 | 7/2004 | Bannon et al. | |
| 6,862,947 B2 * | 3/2005 | Cooper et al. | 74/493 |
| 7,328,631 B2 | 2/2008 | Murakami et al. | |
| 7,665,767 B2 * | 2/2010 | Olgren et al. | 280/777 |
| 7,770,488 B2 | 8/2010 | Kim et al. | |
| 2005/0054499 A1 | 3/2005 | Davies | |
| 2006/0022446 A1 | 2/2006 | Murakami et al. | |
| 2006/0028010 A1 | 2/2006 | Yamada | |

\* cited by examiner

HELICOPTER CONTROL STICK SUPPORT ASSEMBLY

CROSS-REFERENCE TO RELATED APPLICATION

This application is a continuation of U.S. patent application Ser. No. 12/980,838, filed on Dec. 29, 2010, which claims the priority of European Patent Application No: 09425543.7, filed on Dec. 30, 2009, the subject matter of both foregoing applications of which are incorporated herein by reference in their entireties.

BACKGROUND OF THE INVENTION

The present invention relates to a helicopter control stick support assembly.

Military combat helicopters normally have two seats, one for the pilot, and one for the gunner, who controls the weapons and sight movements using two sticks and the information displayed on an instrument panel.

The instrument panel is normally defined by a plate fitted with instruments for monitoring flight and weapon conditions, sight position, etc.; and both the instrument panel and the sticks are normally located in fixed positions in front of the gunner's seat.

This is an awkward solution, in that the gunner must lean slightly forward and/or reach a long way to grip the sticks. And since one of the two sticks is equipped with a force transducer to operate the sight, this awkward gripping position could affect precision control of the sight.

Moreover, even taking into account adjustment of the gunner's seat, the above solution allows no adjustment according to the height and build of the gunner.

SUMMARY OF THE INVENTION

It is an object of the present invention to provide a helicopter control stick support assembly designed to provide a straightforward, low-cost solution to the above problems, and which is easy to use, and comprises relatively few component parts.

According to the present invention, there is provided a support assembly for a helicopter control stick, the support assembly comprises a supporting structure and an instrument panel fixed to each other; and a connecting assembly for connecting the stick to the supporting structure; the connecting assembly comprising an arm elongated in a longitudinal direction and having one end supporting said stick; a guide for connecting the arm in longitudinally sliding manner to the supporting structure, to move the end to and from the supporting structure; and a rotary assembly for connecting the arm to the supporting structure in rotary manner about a horizontal axis, to adjust the height of the end, the rotary assembly having a first releasable retainer, wherein the first releasable retainer operates to lock rotation of said arm with respect to the supporting structure in a desired angular position; wherein the arm is longitudinally slidable when the first releasable retainer is operated to lock rotation of the arm; wherein the horizontal axis extends transversely between the longitudinal ends of the arm.

BRIEF DESCRIPTION OF THE DRAWINGS

A non-limiting embodiment of the invention will be described by way of example with reference to the accompanying drawings, in which.

DETAILED DESCRIPTION OF THE INVENTION

Figure 1:
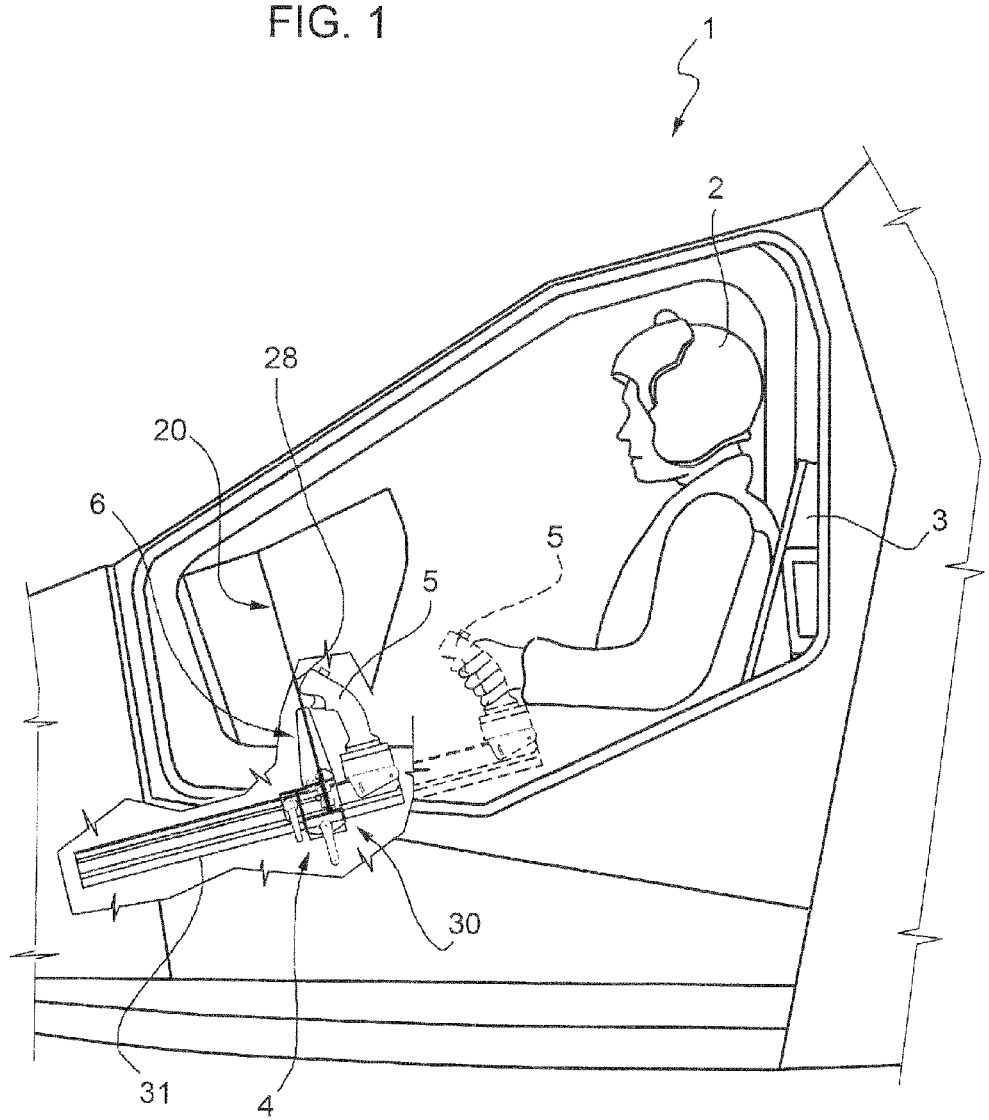
FIG. 1 shows a side view of a preferred embodiment of the helicopter control stick support assembly according to the present invention.

Number 1 in FIG. 1 indicates as a whole a helicopter cabin defining a first seat for a pilot (not shown), and a second seat for a gunner 2. The second seat comprises a seat 3 for gunner 2, and a support assembly 4 supporting two control sticks 5 in front of seat 3.

More specifically, one of the two sticks 5 comprises a control device (not shown) with a force transducer, for moving a sight by which to aim the weapons on the helicopter.

Figure 2:
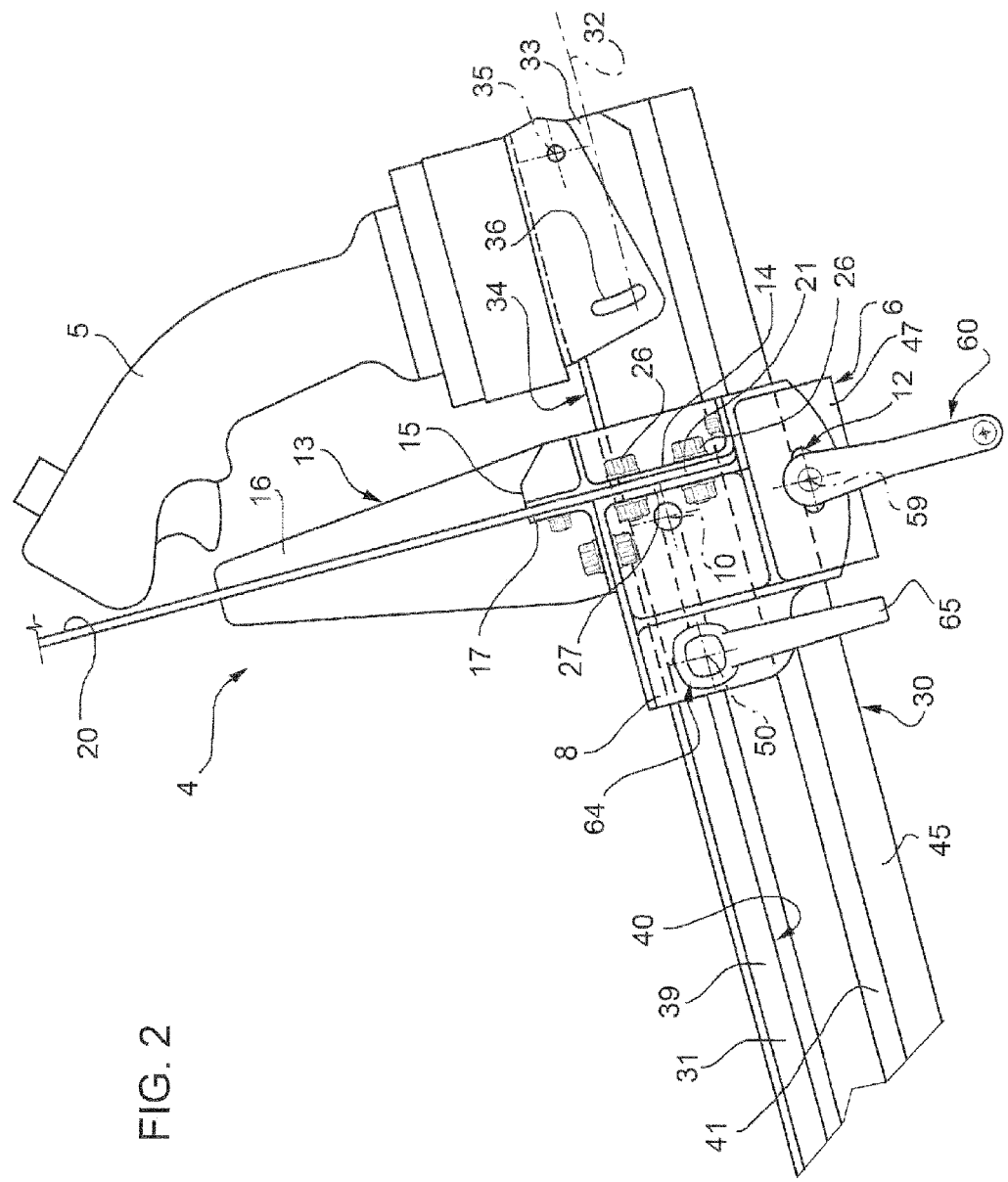
FIG. 2 shows a larger-scale view, with parts removed for clarity, of the FIG. 1 support assembly.
Figure 3:
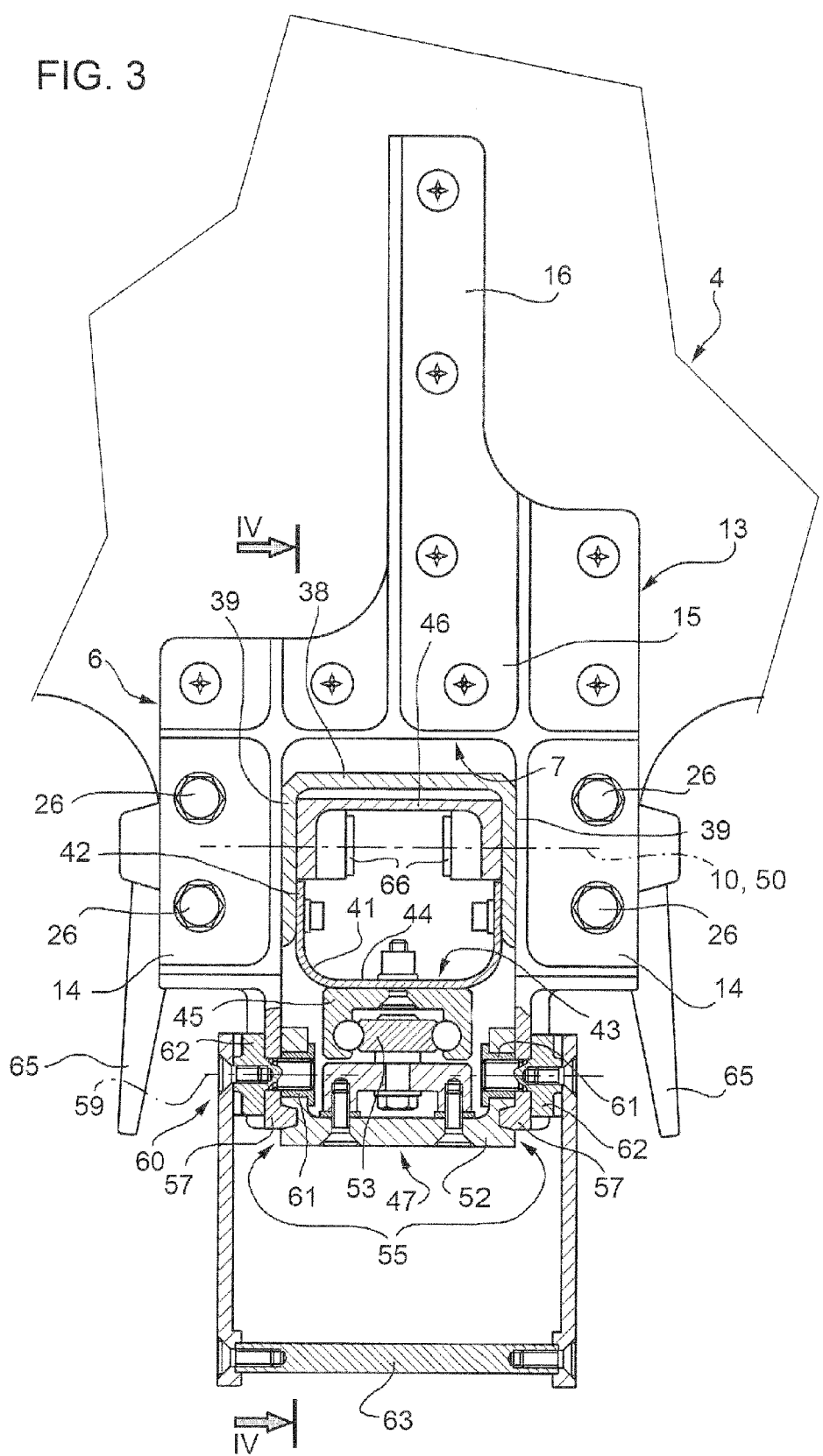
FIG. 3 shows a partly sectioned front view of the FIGS. 1 and 2 support assembly.

With reference to FIGS. 2 and 3, assembly 4 comprises a supporting structure 6, which, viewed from the front, is substantially inverted-U-shaped, and defines the top surface and side surfaces of a passage 7 having a vertical plane of symmetry substantially coincident with the central longitudinal plane of cabin 1 and seat 3. Here and hereinafter, the terms "front", "rear", "side", etc. are intended as seen by gunner 2, and not with reference to the travelling direction of the helicopter.

Structure 6 comprises two side plates 8 defining the rear end and an intermediate portion of passage 7.

Plates 8 have respective pairs of arc-shaped slots 11 (FIG. 4) and 12 (FIG. 2), the centre of curvature of which coincides with the same horizontal axis 10 perpendicular to the plane of symmetry of passage 7. Slots 11, 12 on each plate 8 have the same angular extension, and are spaced roughly 90° apart.

With reference to FIG. 3, structure 6 also comprises an inverted-Y-shaped front plate 13 defining the front end of passage 7, i.e. the outlet end of passage 7 in front of seat 3. Plate 13 comprises two bottom appendixes 14 on either side of passage 7; and a top portion 15 over passage 7 and in turn comprising an appendix 16 extending upwards.

As shown in FIG. 2, structure 6 also comprises a rear plate 17, which has substantially the same perimeter and shape as portion 15, defines the top of the intermediate portion of passage 7, and is fixed by its lateral ends to respective plates 8.

Plates 8, 13 and 17 are ribbed, in a manner not described in detail, to reinforce structure 6 and fix plates 8, 13, 17 to one another.

Assembly 4 also comprises an instrument panel 20 perpendicular to passage 7 (FIG. 2), and which comprises a connecting portion 21 interposed between plate 13 (at the front) and plates 8 and 17 (at the rear), and tightened by bolts 26 between appendixes 14 and two corresponding front ribs 27 on plates 8. The fastening points defined by bolts 26 are preferably also used to fix structure 6 and instrument panel 20 to the ends of two struts (not shown) fixed at the opposite ends to the walls or frame of cabin 1.

Instrument panel 20 comprises a display portion 28 (FIG. 1) above portion 21 and fitted with indicators and/or a display (not shown).

Sticks 5 are connected to structure 6 by a connecting device 30, which comprises an arm 31 extending inside passage 7, in a longitudinal direction 32 in the plane of symmetry of passage 7. Sticks 5 are fitted to an end 33 of arm 31, and are arranged side by side on a top face 34 of end 33 (so only one is visible in the FIG. 2 side view). More specifically, sticks 5 are fitted to end 33 to rotate, with respect to arm 31, about an axis 35 parallel to axis 10; and a releasable retaining device 36, only shown partly and not described in detail, enables gunner 2 to lock sticks 5 in position about axis 35.

With reference to FIG. 3, arm 31 comprises a top section 38 having an inverted-U-shaped cross section and two vertical lateral walls 39 with respective longitudinal slots 40 (FIG. 2). Section 38 is the same width as passage 7, so walls 39 slide on the inner lateral surfaces of passage 7.

Arm 31 comprises an intermediate section 41, which has a U-shaped cross section, comprises two lateral walls 42 inside section 38 and fixed to walls 39, and together with section 38 defines a longitudinal cavity 43. Section 41 comprises an intermediate bottom wall 44 fixed to a longitudinally elongated bottom body 45 with an inverted-U-shaped cross section.

Device 30 comprises two guides 46, 47 connected in angularly-fixed, longitudinally-sliding manner to arm 31. Guide 46 is housed in cavity 43 and connected to arm 31 by pins 48, 49 (FIG. 4) which slide inside slots 40. Pins 49 extend along axis 10 and are fitted to plates 8 to define a hinge; whereas pins 48 are aligned with slots 11 along an axis 50 parallel to axis 10, and slide inside slots 11 between two angular limit positions defined by the top and bottom edges of slots 11 and covering a maximum angle of 20-30°.

Guide 47 comprises a bottom support 52; and a top slide 53, which is fixed to support 52, is housed inside body 45, and is fitted to the lateral walls of body 45 to slide parallel to direction 32. Support 52 has two outer lateral faces 55 with respective arc-shaped grooves 56 (FIG. 4), the centre of curvature of which coincides with axis 10. Grooves 56 are engaged in sliding manner by respective guide projections 57 fitted to the bottom ends of plates 8 and substantially complementary in shape to grooves 56.

As shown in FIG. 3, a releasable locking device 60 frictionally locks rotation of guide 47 about the hinge defined by axis 10, and comprises: two nut screws 61 fixed with respect to faces 55, located above grooves 56, and aligned with slots 12 along an axis 59 parallel to axis 10; and two threaded members 62 screwed inside respective nut screws 61, and which move inside slots 12 between two angular limit positions defined by the right and left edges of slots 12 and corresponding to the angular limit positions of pins 48. Device 60 also comprises a lever 63 to rotate threaded members 62 together about axis 59, and grip their ends axially against the outer lateral faces of plates 8 to frictionally lock rotation of guide 47.

Figure 4:
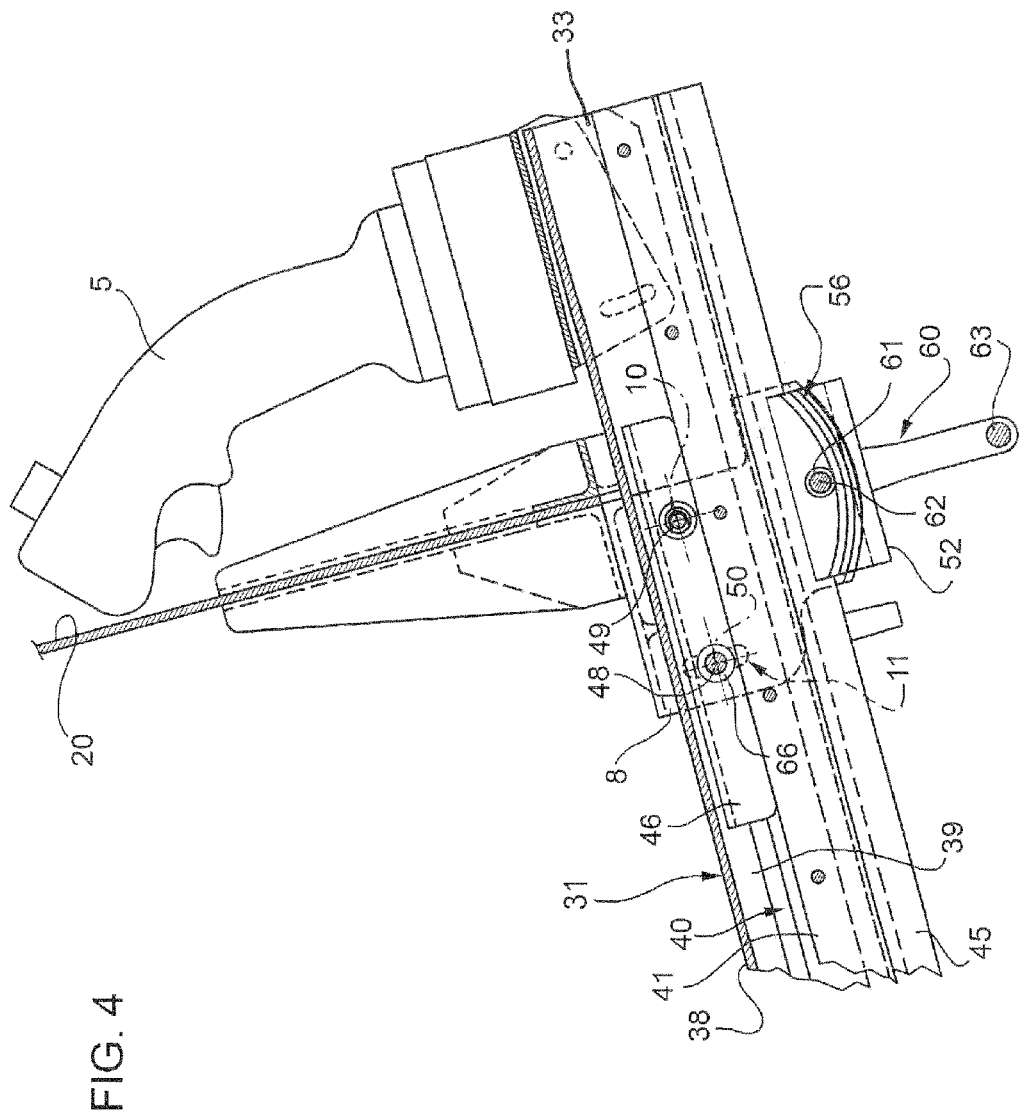
FIG. 4 shows the same view as in FIG. 2, and a section of the support assembly along line IV-IV in FIG. 3.

With reference to FIGS. 2 and 4, pins 48 are threaded and form part of a releasable locking device 64 for gripping walls 39 between guide 46 and plates 8 to frictionally lock both rotation and slide of arm 31. Device 64 is independent of device 60, and comprises two levers 65 for respectively screwing/unscrewing pins 48 inside respective nut screws 66 fixed in relation to respective lateral walls of guide 46.

When frictional locking device 64 is released, arm 31 can slide, with respect to guides 46, 47 and pins 48, 49, which also perform a guide function, into a fully withdrawn position, in which end 33 and sticks 5 are positioned close to the front of instrument panel 20 to allow gunner 2 to move freely in and out of his seat. Once settled in seat 3, gunner 2 can pull arm 31 longitudinally to draw sticks 5 horizontally away from the instrument panel and into the best position to grip sticks 5 (as shown by the dash line in FIG. 1). At the same time, by releasing device 60, the height of sticks 5 can also be adjusted by rotating arm 31 about axis 10. When so doing, guides 46, 47 rotate together with arm 31.

For example, arm 31 may be slid and rotated to rest end 33 on or between the knees. Once set to the required position, arm 31 is preferably locked in place using device 64.

If arm 31 is subjected to vibration transmitted by structure 6, however, locking devices 60, 64 may be loosened slightly or completely, to prevent vibration being transmitted.

When locking device 64 is released, the angle of arm 31 about axis 10 locked by device 60 remains unchanged, so that the same gunner occupying the seat need only set the angle of arm 31 once, and only operate device 64 to lock/release the arm in direction 32, i.e. to adjust sticks 5 with respect to control panel 20.

To leave the seat quickly, in the event of an emergency, arm 31, even when locked by device 64, can be pushed by gunner 2 towards instrument panel 20 forcefully enough to overcome the friction exerted by device 64 on arm 31, and so slide the arm in to permit easy exit from seat 3.

By fitting sticks 5 to an arm 31 that can be extended or extracted from support 6, gunner 2 obviously need no longer lean or reach forward to grip sticks 5. Assembly 4 also provides for relatively wide adjustment of both the height and longitudinal position of sticks 5, to enable gunner 2 to adjust the position of the sticks to his own height and build, and to the set position of seat 3.

Another advantageous adjustment is permitted by rotation about axis 35 and by device 36, which provide for adjusting sticks 5 with respect to the forearms of gunner 2.

Ergonomically positioning sticks 5 makes for more accurate sight control as compared with known solutions allowing no stick position adjustment.

Moreover, axis 10 being located between the ends of arm 31 and extending across arm 31, structure 6 is compact, while allowing ample freedom of adjustment.

As stated, devices 60 and 64 operate independently, so arm 31 can be slid longitudinally with no change in the angle of arm 31.

Clearly, changes may be made to support assembly 4 as described herein without, however, departing from the scope of the present invention as defined in the accompanying Claims.

In particular, assembly 4 may be applied to adjust the position of sticks other than the weapon control sticks described.

Guide 46 may be located outside arm 31, possibly connected to structure 6 by a hinge system other than the one described; and/or arm 31 may feature guide members other than slots 40 and pins 48, 49, or be telescopic; and/or guide 47, body 45, device 60, and projections 57 as a whole may be eliminated, and only device 64 used to lock arm 31; and/or instrument panel 20 may be fixed to a supporting structure in a different manner from the one described by way of example.

I claim:

1. A support assembly for a helicopter control stick, the support assembly comprising a supporting structure and an instrument panel fixed to each other; and a connecting assembly for connecting said stick to said supporting structure; said connecting assembly comprising:
    an arm elongated in a longitudinal direction and having one end supporting said stick;
    a guide for connecting said arm in longitudinally sliding manner to said supporting structure, to move said end to and from said supporting structure; and
    a rotary assembly for connecting said arm to said supporting structure in rotary manner about a horizontal axis, to adjust the height of said end, said rotary assembly having a first releasable retainer, wherein said first releasable retainer operates to lock rotation of said arm with respect to said supporting structure in a desired angular position;

wherein said arm is longitudinally slidable when said first releasable retainer is operated to lock rotation of said arm;

wherein said horizontal axis extends transversely between the longitudinal ends of said arm.

2. The support assembly of claim 1, wherein said supporting structure comprises a stop defining the maximum rotation angle of said arm.

3. The support assembly of claim 1, further comprising a second releasable retainer comprising a gripper which acts on a friction coupling to prevent translation of said arm.

4. The support assembly of claim 1, wherein said guide comprises an intermediate member fitted in longitudinally-sliding manner to said arm; said rotary assembly defining a hinge between said intermediate member and said supporting structure.

5. The support assembly of claim 4, wherein said arm is hollow and at least partly houses said intermediate member.

6. The support assembly of claim 5, wherein said rotary assembly comprises at least one horizontal hinge pin which engages in sliding manner a longitudinal slot in said arm.

7. The support assembly of claim 6, wherein said guide comprises a horizontal guide pin parallel to and spaced longitudinally apart from said hinge pin, and which engages said longitudinal slot in sliding manner.

* * * * *